Feb. 8, 1966  H. L. PENBERTHY  3,233,756
LIQUID LEVEL CONTROL DEVICE
Filed May 3, 1963  4 Sheets-Sheet 3

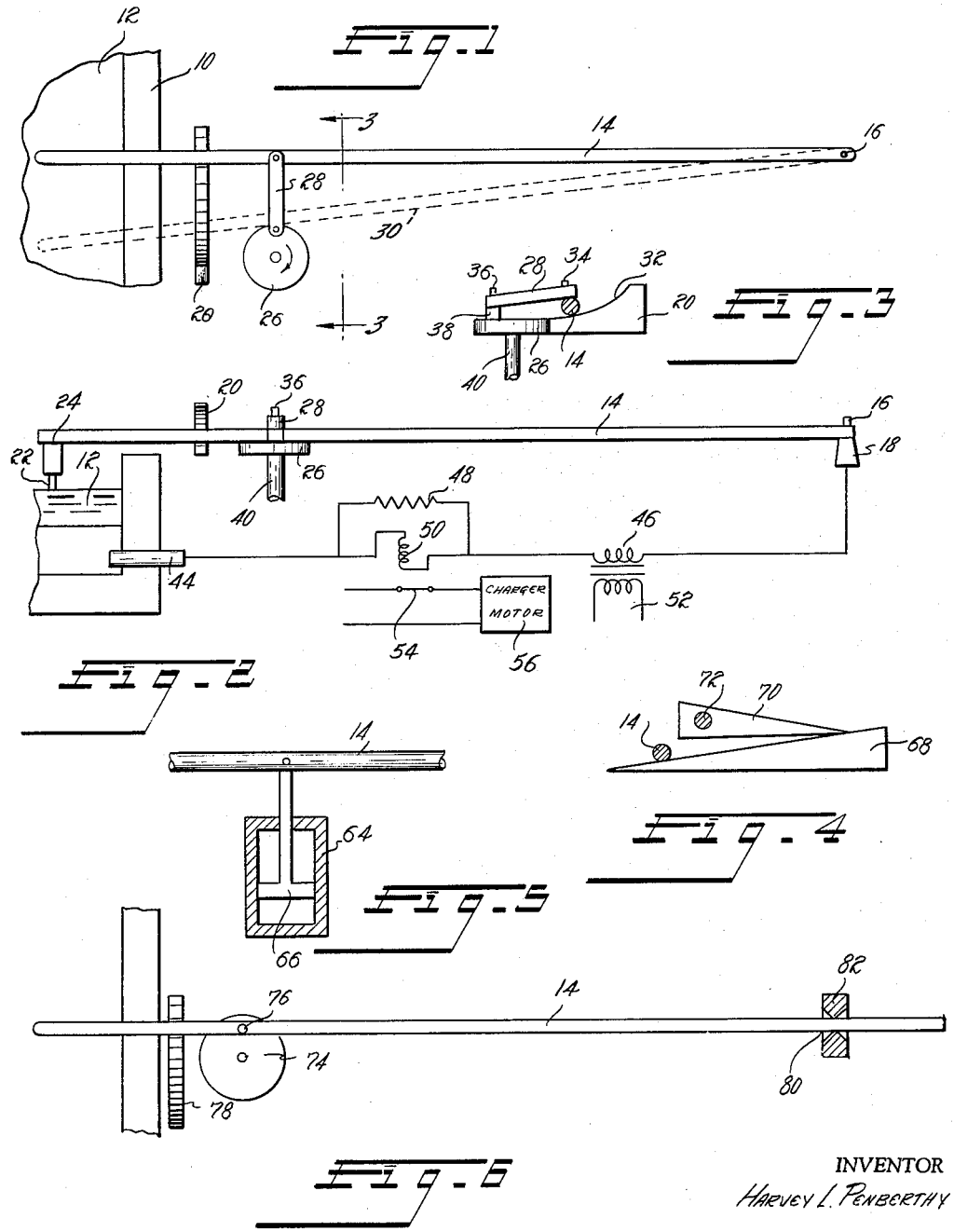

INVENTOR
HARVEY L. PENBERTHY

BY

Le Blanc and Shur
ATTORNEYS

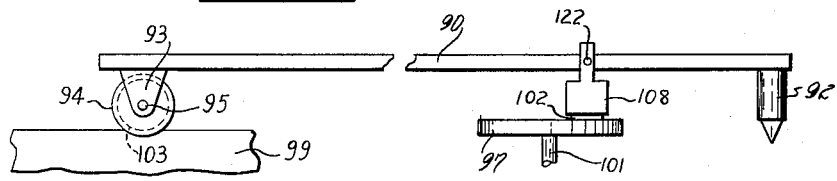
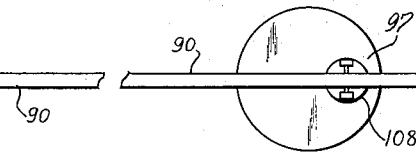
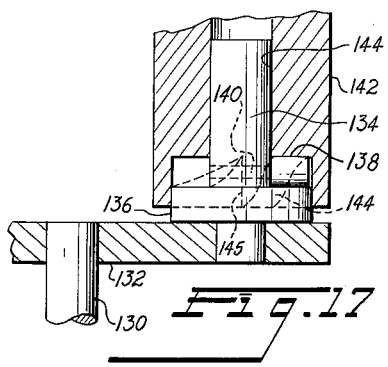
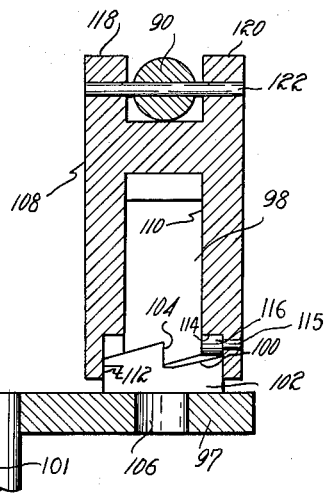

United States Patent Office 3,233,756
Patented Feb. 8, 1966

3,233,756
LIQUID LEVEL CONTROL DEVICE
Harvey L. Penberthy, 5624 SW. Admiral Way,
Seattle, Wash.
Filed May 3, 1963, Ser. No. 277,743
21 Claims. (Cl. 214—18.2)

This invention relates to a level control device for tanks containing a molten bath and more particularly relates to a level control device for use with tanks or containers containing molten glass.

The problem of maintaining a constant liquid level in liquid containing tanks in general and in molten bath containing tanks in particular is relatively old and has been the subject of a large variety of proposed solutions. One common practice is the use of a float as a control element. This is objectionable because the float is attacked by the bath and the apparatus must be adjusted at more or less frequent intervals to compensate for the loss of mass in the float which lowers its level in the bath.

Another practice has been the use of stationary contact elements in an electric circuit of which the molten bath forms a part. This system is inaccurate because the material of the bath tends to adhere to the contact elements and to form strings when the elements would otherwise be out of electrical contact with the bath. In addition this system lacks sensitivity and flexibility of control unless an extremely large number of contact elements are utilized.

Of the attempts made to overcome the deficiencies in the foregoing systems probably the most common expedient has been the use of a vertically reciprocating contact element which is moved in cyclic order downwardly from a predetermined relatively fixed upper limit to the surface of the molten glass, at whatever level that may be, and then upwardly again to the same upper limit. While this provides a theoretically improved sensitivity and flexibility it does not eliminate the formation of strings on the tip of the contact element and thus as a matter of actual practice offers little improvement over the older systems.

The inaccuracy caused by the formation of such strings has been recognized in the art and it has been proposed to eliminate contact between the contact element and the surface of the molten material by the use of an extremely high voltage which causes an arc to jump from the contact element to the surface. This is a rather expensive arrangement and is incapable of really fine accuracy due to the variation in the gap at which the arc occurs. The critical arcing gap is dependent upon the temperature, composition and condition of tranquility of the gas above the surface of the liquid and also varies with slight changes in the contour and smoothness of the tip of the contact element.

Other systems have been proposed for use with liquids other than molten materials and these also have utilized vertically reciprocating contact elements. Since, however, ordinary liquids may be pumped into or out of the tank much more readily than molten materials, and since the problem of stringing is not present, these solutions are not practically adaptable to baths of molten material, particularly to the control of the charging rate of a glass furnace.

A satisfactory liquid level controller for molten baths must eliminate the stringing problem, must be sensitive to small changes in bath levels, must be capable of withstanding extreme heat, must be mechantically simple and durable, must provide a simple and economical motor control arrangement, and must be capable of proportionate response to changes in liquid level.

According to my invention these purposes are accomplished by means of a movable contact element which not only reciprocates up and down but also moves in a transverse direction. Control of the charger motor is accomplished in a very simple fashion with a minimum of equipment and the charger reacts proportionately to variations from the normal liquid level.

It is accordingly a primary object of the present invention to provide a level control device which is flexible, sensitive, durable and simple in construction.

It is another object of the invention to provide a level control device utilizing a moving contact element which substantially eliminates the stringing problem.

It is another object of the invention to provide a liquid level control device for molten glass baths which provides a charger control which responds proportionately to variations in bath level.

It is another object of the invention to provide a liquid control device utilizing a movable contact element which moves vertically as well as in a transverse direction.

It is another object of the invention to provide liquid level control device for molten baths which is capable of withstanding extremely high temperatures over a long period of time.

These and further objects and advantages of the invention will become apparent upon reference to the following specification and claims and appended drawings wherein:

FIGURE 2 is an elevation view of the liquid level control device of the invention;

FIGURE 3 is a vertical elevation of the cam member utilized in the liquid level control device shown in FIGURES 1 and 2;

FIGURE 4 is a vertical elevation of another embodiment of a cam element;

FIGURE 5 is a plan view of another embodiment of a movable contact element according to the invention;

FIGURE 6 is a plan view partly in section showing another embodiment of a means for moving the movable contact element according to the invention;

FIGURES 7, 8, 9 and 10 are graphs depicting the operation of the liquid level control device of the invention;

FIGURE 14 is a side elevation of another embodiment of the invention;

FIGURE 15 is a plan view of the embodiment shown in FIGURE 14;

FIGURE 16 is a vertical cross section of the drive table and actuating device of FIGURES 14 and 15; and FIGURE 17 is a partial vertical section of a modification of the device shown in FIGURES 14–16.

Figure 1:
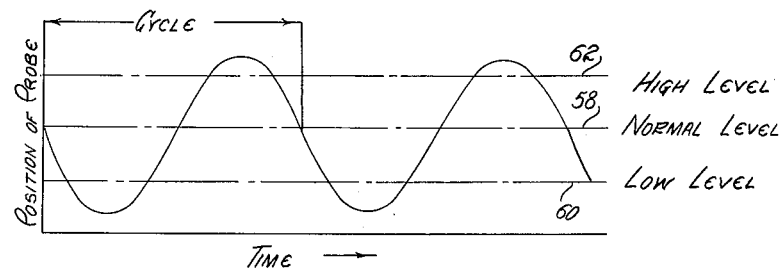
FIGURE 1 is a plan view showing the movable contact element of the liquid level control device of the invention.

Referring to FIGURES 1 and 2 of the drawing there is shown a glass tank 10 containing a bath of molten glass 12. An elongated tubular arm 14 extends over the molten glass bath 12 and is pivoted at 16 to a stationary support 18. The pivot connection at 16 is of a type having sufficient play or clearance to permit a slight vertical movement of the distal end of the arm 14 for a reason presently to become apparent.

The end of arm 14 distal of pivot 16 is supported on a cam plate 20 and carries a contact element 22 of platinum or some other refractory metal at its outer end. The contact element 22 is preferably encased in an oxide refractory 24 which extends down to within a short distance of the surface of the molten glass bath 12.

A drive wheel 26 is connected to the arm 14 by means of a link 28 so that upon rotation of the drive wheel 26 the arm 14 moves transversely between the solid line position shown in FIGURE 1 and the broken line position shown at 30.

Referring to FIGURE 3 it will be seen that the cam plate 20 possesses a cam surface 32 which causes the free end of arm 14 to move up and down as the drive wheel 26 rotates. The cam surface 32 is shown as being curved but it will be understood that it may be linear or curved in other forms than that indicated. It will be seen that the link 28 is connected to the shaft 14 by means of a pivot 34 and is connected to the drive wheel 26 by means of a pivot pin 36 seated in a stud 38. Rotation is imparted to the drive wheel by means of a shaft 40 connected to any suitable source of power, such as an electrical motor.

It will be apparent from an inspection of FIGURES 1 and 2 that as the drive wheel 26 rotates, the movable contact element 22 defines a transverse curved movement while at the same time moving vertically at a rate determined by the slope of the cam surface 32.

Figure 11:
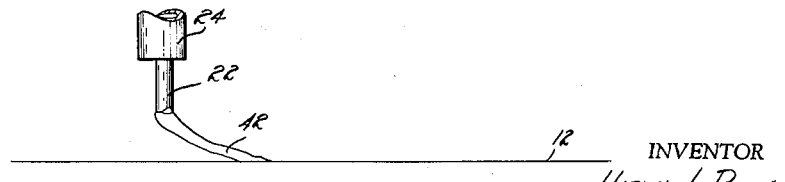
FIGURE 11 is a side elevation of the contact element as it leaves the surface of the liquid illustrating the string breaking action of the invention.

Referring to FIGURE 11, which shows a magnified view of the contact element 22 as it moves across the surface of the glass bath 12 under the influence of the driving mechanism shown in FIGURES 1 and 2, it will be seen that the string 42, which follows the contact element 22 as a result of wetting of the contact, is rapidly stretched in a transverse direction so that it breaks without any appreciable vertical movement of the contact element 22. This breaking is accomplished not only through the rapid extension of the string 42 caused by the transverse movement of the contact element, but also through the action of gravity in carrying the center of the string downward to further extend it and hasten its break.

Referring again to FIGURE 2, an electrode 44 is mounted in the tank 10 at any convenient position near the movable contact element 22 and this electrode is connected to the arm 14 and movable contact element 22 through a transformer secondary 46 and parallel connected resistor 48 and relay 50. The transformer primary 52 associated with secondary 46 is connected to a suitable source of alternating current supply, such as line voltage, and the transformer is so designed that a relatively high current flows in the secondary circuit when the movable contact element 22 is in contact with the molten glass bath 12. The resistor 48 which shunts the relay 50 regulates the current which passes through the relay winding so that the relatively high current flowing in the contact element circuit will not damage the relay.

The relay 50 actuates a normally closed switch 54 which is connected in circuit with the supply voltage to the batch charger motor 56. When current flows through the movable contact element 22 the relay 50 is energized and the charger motor 56 remains stationary.

Figure 8:
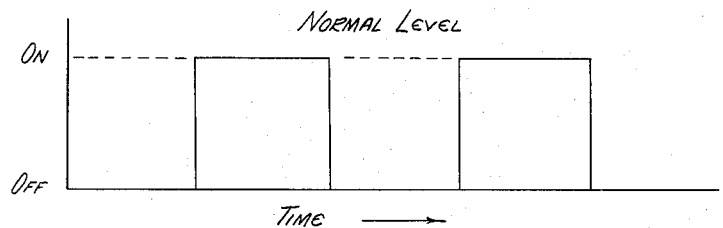

Turning now to FIGURES 7 through 10 there is shown the effect of a change in glass level upon the operation of the batch charger motor 56. Referring to FIGURE 7 there is shown a graph of the vertical movement of the contact element plotted against time where, as an example, the vertical movement approximates a sine wave. When the level of the glass bath is normal, as shown by the broken line 58, the relay 50 and switch 54 turn the batch charger motor 56 off and on at equal intervals so that the motor is on for approximately one-half of the time, as shown in the diagram of FIGURE 8.

Figure 9:
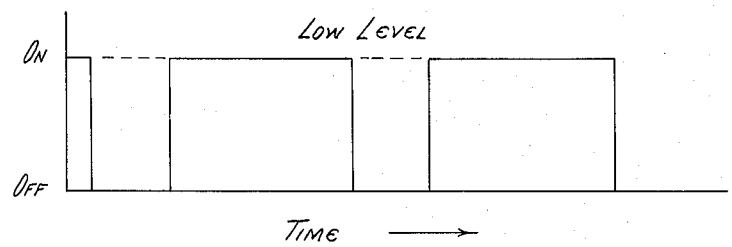
Figure 10:
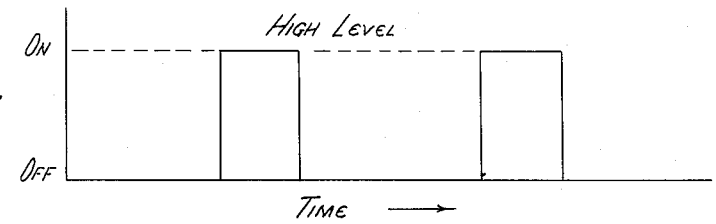

If now the glass level in the tank becomes low, as indicated by the broken line 60 in FIGURE 7, current flows through the relay 50 only during the time that the movable contact element 22 is in contact with the bath 12 and during this time current to the charger motor 56 is interrupted. Referring to FIGURE 9 it is seen that the charger motor is now on approximately twice as long as it is off, delivering a proportionately larger amount of batch to the glass tank and thereby increasing the glass level.

Where the level of the molten glass bath in the glass tank is high, as shown by the broken line 62 in FIGURE 7, current flows to the charger motor 56 during a much smaller portion of the time, as shown in FIGURE 10, thereby allowing the normal pull from the glass tank to lower the glass level. It will be appreciated that with this arrangement the charger motor not only increases the rate of charge to the glass tank when the glass level is low, but increases the rate of charge in proportion to the amount by which the glass level differs from the normal or desired amount. Thus where the glass is considerably lower than normal, as is indicated by the broken line 60 in FIGURE 7 and the diagram in FIGURE 9, the charger operates approximately two thirds of the time. Where, however, the liquid level is only slightly below normal the charger motor operates only slightly more than one half of the time.

While I have disclosed the control circuit as turning the charger motor either on or off, my invention is not limited to such a control of the rate of feed of the charging means but may provide for other charge rate control means as will be apparent to those skilled in the art. For example, by way of illustration only and not by way of limitation, variable rate charge means of the type shown in U.S. Patents Nos. 2,565,136 or 2,613,002 may be utilized.

Figure 13:
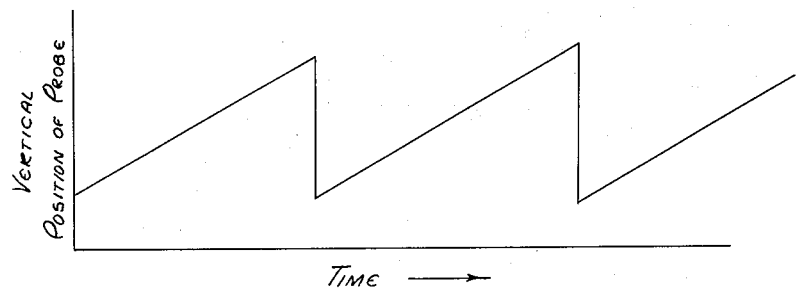

According to the preferred embodiment of my invention, I have found that more rapid string elimination can be obtained if the contact element is caused to rise slowly during the time that the transverse movement takes place. Referring to FIGURE 5 there is shown an alternative method of providing the vertical movement through the use of a hydraulic cylinder 64 which actuates a piston 66 to drive the arm 14. By providing suitable valving in the cylinder 64 the arm 14 is caused to rise at a relatively slow rate and then drop to its lowermost position in a very short period of time. FIGURE 13 shows a diagrammatic representation of such a movement. During the relatively slow rise of the contact element rapid transverse movement takes place to stretch the string 42 in FIGURE 11 and rapidly break it before the contact element has achieved any great height.

Figure 12:
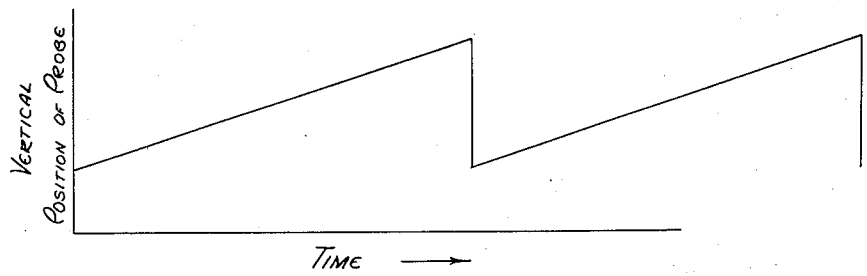
FIGURES 12 and 13 are graphical depictions of the operation of further embodiments of the liquid level control device of the invention.

Referring to FIGURE 4 there is shown another embodiment of a cam utilizing a triangular cam plate 68 and a movable cam element 70 which is pivoted at 72. The arm 14 moves up the triangular cam plate 68 and then, upon reversing its movement, moves back over the top of arm 70 and drops down to the triangular cam plate as it passes over the end of the element 70. The shape of the pivoted cam element 70 is such that the arm continues to move up as it crosses the cam element and only commences to move down when it drops off the end thereof. By properly shaping this cam element the arm can be made to rise at the same rate while passing over both the cam plate 68 and cam element 70. This produces a movement of the contact element which is shown diagrammatically in FIGURE 12 and accomplishes a rapid break of any string which tends to form.

Referring to FIGURE 6 there is shown a different method of transversely moving the arm 14 through the use of a drive wheel 74 which is connected to the arm 14 by means of a pin 76. The arm 14 is free to slide up and down over the pin 76 as it is moved in a vertical direction by means of the cam plate 78. The end of the arm 14 distal of the contact element passes through an opening 80 in a stationary block 82 which prevents transverse movement of the arm 14 while permitting sliding motion therethrough.

Referring to FIGURES 14, 15 and 16 there is shown still another embodiment of my invention for accomplishing a large transverse movement of the movable contact during a limited vertical movement. An arm 90 having a movable contact element 92 carries at its other end a U-shaped bracket 93 in which a roller 94 is pivoted at 95. The roller 94 is grooved about its periphery as indicated at 103, and this groove rides on a track 99. A table 97 is rotatably mounted on a shaft 101 and is provided with a stud 98 having a helical cam surface 100 formed on an enlarged base portion 102. The helical cam surface 100 is broken and is discontinuous at 104 and the stud 98 is mounted on the table 97 by means of a lug 106 which is fastened to the table 97 in any suitable manner.

A sleeve 108 having an inner bore 110 is received on the stud 98 and is provided with a counter bore 112 which defines a surface 114 which clears a roller bearing 116 pivoted at 115 in sleeve 108 and riding on the cam surface 100. The other end of the sleeve 108 is bifurcated and arms 118 and 120 receive the arm 90 therebetween. The arm 90 is pivotally connected to the bifurcated end of the sleeve 108 by any suitable means such as a pin 122.

It will be seen that as the table 97 rotates the roller bearing 116 rolls across the helical cam surfaces 100 to raise the sleeve 108 and then allow it to drop as the roller 116 drops over the break 104 in the helical cam surface 100. This provides a high degree of transverse movement per unit of vertical movement and is an extremely effective method of eliminating stringing. It is to be noted that the distances between the axes 95 and 122 and the contact element 92 remain constant during operation.

Referring to FIGURE 17 there is shown a modification of the embodiment of FIGURE 16 which eliminates the need for two bearing surfaces. The shaft 130 drives the table 132 which carries a stud 134 having an enlarged base portion 136. A roller bearing 138 is pivotally carried by stud 134 on an axle 140 extending through the stud. The bearing 138 clears the surface of enlarged base portion 136.

A sleeve 142 having an inner bore 144 is received on the stud 134 and is provided with a counterbored helical cam surface 144 against which the roller bearing 138 rides. The helical cam surface 144 is broken and discontinuous at 145. It will be seen that as the table 132 rotates, the roller bearing 138 rolls across the helical cam surface 144 with its axis perpendicular to the axis of the shaft 130 to raise the sleeve 142 and then allow it to drop as the roller 138 drops over the brake 145 in the helical cam surface 144.

Various other methods of providing for transverse and vertical movement of the contact element will be apparent to those skilled in the art and the embodiments described herein are intended to be illustrative and not restrictive in nature.

It will be apparent from the foregoing that I have provided a method of liquid level control which is simple in construction, durable in nature, accurate, and sensitive to slight changes in liquid level. The device is particularly applicable to the control of the level of a bath of molten glass and provides for proportionate control of the batch charger mechanism.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A liquid level control device for controlling the level of an electrically conducting liquid of high viscosity comprising, an electrically conducting member, means for mounting said member above the surface of said liquid, means for moving the end of said member in a cyclic path passing through the surface of said liquid and having both vertical and horizontal motion components, means for raising the level of said liquid, control means for said last named means, and an electrical circuit including said member, said liquid and said control means.

2. A liquid level control device for a bath of molten electrically conducting material comprising, an electrically conducting member, means for mounting said member above the surface of said bath, means for moving the end of said member in a cyclic path passing through the surface of said bath and having both vertical and horizontal motion components, means for charging said bath with batch material, means for changing the energization of said charging means, and an electrical circuit including said member, said bath and said means for changing the energization of said charging means.

3. A liquid level control device for a bath of molten electrically conducting material comprising, an electrically conducting member, means for mounting said member above the surface of said bath, means for moving the end of said member in a cyclic path passing through the surface of said bath and having both vertical and horizontal motion components, at least a portion of the vertical movement in an upward direction being at a smaller rate than the vertical movement in a downward direction, means for charging said bath with batch material, means for changing the energization of said charging means, and an electrical circuit including said member, said bath and said means for changing the energization of said charging means.

4. A liquid level control device for a bath of molten electrically conducting material comprising, an electrically conducting member, means for mounting said member above the surface of said bath, means for moving the end of said member in a cyclic path passing through the surface of said bath and having both vertical and horizontal motion components, said moving means moving said member transversely a greater distance than vertically during the rising portion of said cycle, means for charging said bath with batch material, means for changing the energization of said charging means, and an electrical circuit including said member, said bath and said means for changing the energization of said charging means.

5. A liquid level control device for a bath of molten electrically conducting material comprising, an electrically conducting member, means for mounting said member above the surface of said bath, means for moving the end of said member in a cyclic path passing through the surface of said bath and having both vertical and horizontal motion components, said moving means moving said member transversely a greater distance than vertically during the rising portion of said cycle, at least a portion of said rise being at a lesser rate than a portion of the fall in said cycle, means for charging said bath with batch material, means for changing the rate of feed of said charging means, and an electrical circuit including said member, said bath and said means for changing the rate of feed of said charging means.

6. A liquid level control device for a bath of molten electrically conducting glass comprising, an electrically conducting member of refractory metal, a conducting arm extending over said bath and carrying said member at one end thereof, means for imparting a rising and falling motion to said one end, means for imparting a transverse motion to said one end, said transverse motion being at a greater rate than said rising and falling motion, means for charging said bath with unmelted glass batch, means for changing the energization of said charging means, and an electrical circuit including said member, said molten glass and said means for changing the energization of said charging means.

7. A liquid level control device as set out in claim 6 wherein said means for imparting a rising and falling motion constitutes a cam and said means for imparting transverse motion comprises a drive wheel drivingly connected to said arm for moving said arm across said cam.

8. A liquid level control device for controlling the level of an electrically conducting liquid comprising, means for changing said liquid level, a member carrying a conducting element, means for moving said conducting element in a transverse circular path, means for raising and lowering the end of said element into and out of the surface of said liquid during said transverse movement, and an electrical control circuit including said liquid, said element and said means for changing the liquid level.

9. A device as set out in claim 1 including a rotatable member, an eccentric on said rotatable member, drive means rotatably mounted on said eccentric, a driven element connected to said drive means and carrying said electrically conducting member, and means cooperating with said eccentric and said drive means to impart a vertical movement to said driven element upon rotation of said rotatable member.

10. A device as set out in claim 1 including a rotatable member, an eccentric on said rotatable member, a cam surface associated with said eccentric, drive means rotatably mounted on said eccentric, a driven element connected to said drive means and carrying said electrically conducting member, and a drive surface on said drive means associated with said cam surface to impart a vertical movement to said driven element upon rotation of said rotatable member.

11. A device as set out in claim 1 including a rotatable member, an eccentric on said rotatable member, a cam surface associated with said eccentric, drive means rotatably mounted on said eccentric, a driven element connected to said drive means and carrying said electrically conducting member, and a drive surface on said drive means, and a drive element between said drive surface and said cam surface to impart a vertical movement to said driven element upon rotation of said rotatable member.

12. A device as set out in claim 1 including a rotatable member, upstanding eccentric means on said rotatable member, drive means rotatably mounted on said eccentric means, a cam surface on at least one of said means, roller means between said eccentric means and said drive means and engaging said cam surface for rolling movement therearound as said rotatable member rotates, said rolling movement of said roller means causing vertical movement of said drive means, and a driven element connected to said drive means and carrying said electrically conducting member.

13. A device as set out in claim 1 including a rotatable member, upstanding eccentric means on said rotatable member, drive means rotatably mounted for rotation on said eccentric means, a helical cam surface carried by one of said means, roller means between said eccentric means and said drive means and engaging said cam surface for rolling movement there around as said rotatable member rotates, said rolling movement of said roller means causing vertical movement of said drive means, and a driven element connected to said drive means and carrying said electrically conducting member.

14. A device as set out in claim 1 including a rotatable member, upstanding eccentric means on said rotatable member, drive means rotatably mounted for rotation on said eccentric means, a cam surface carried by one of said means, roller means between said eccentric means and said drive means and rotatably attached to the other of said means and riding on said cam surface for causing vertical movement of said drive means as said rotatable member rotates, and a driven element connected to said drive members and carrying said electrically conducting member.

15. A liquid level control device as set out in claim 14 wherein said cam surface is on said eccentric means, and said roller means is pivoted to said drive means.

16. A liquid level control device as set out in claim 14 wherein said cam surface is on said drive means, and said roller means is pivoted to said eccentric means.

17. In a liquid level control device for controlling the level of an electrically conducting liquid, a rotatable member, upstanding eccentric means on said rotatable member, drive means rotatably mounted for rotation on said eccentric means, a cam surface carried by one of said means, roller means between said eccentric means and said drive means and rotatably attached to the other of said means and riding on said cam surface for causing vertical movement of said drive means as said rotatable member rotates, a driven element connected to said drive means and having an end extending over the surface of the liquid whose level is to be controlled, and an electrical contact on said end of said driven element adapted to engage said surface of said liquid and to move away from said surface with both a vertical and lateral component of movement.

18. A liquid level control device as set out in claim 17 wherein said cam surface is on said eccentric means, and said roller means is rotatably attached to said drive means.

19. A liquid level control device as set out in claim 17 wherein said cam surface is on said drive means, and said roller means is rotatably attached to said eccentric means.

20. A liquid level control device for controlling the level of an electrically conducting liquid comprising an elongated arm having a sensing contact at one end thereof, the other end thereof being mounted for movement along a predetermined line, a drive member attached to said elongated arm intermediate the ends thereof, a member rotatable about a vertical axis, a stud member mounted on said rotatable member eccentric to its axis of rotation, said stud member having a cylindrical surface with an axis parallel to said axis of rotation, said drive member having a surface engaging said cylindrical surface of said stud member, a cam surface on one of said members, a roller bearing between said stud member and said drive member engaging said cam surface and rotatably mounted on the other member whereby rotation of said rotatable member causes both vertical and translational motion of said sensing contact.

21. A liquid level control device as set out in claim 20 wherein said other end of said elongated arm carries a roller, said roller rolling on a track.

References Cited by the Examiner

UNITED STATES PATENTS

| | | | |
|---|---|---|---|
| 502,828 | 8/1893 | Patten | 74—54 |
| 2,426,347 | 8/1947 | Fulton | 214—18.2 |
| 2,613,002 | 10/1952 | Light et al. | 214—18.2 |
| 2,891,686 | 6/1959 | Roberson et al. | 214—18.2 |

GERALD M. FORLENZA, *Primary Examiner.*

HUGO O. SCHULZ, *Examiner.*